Figure 1:
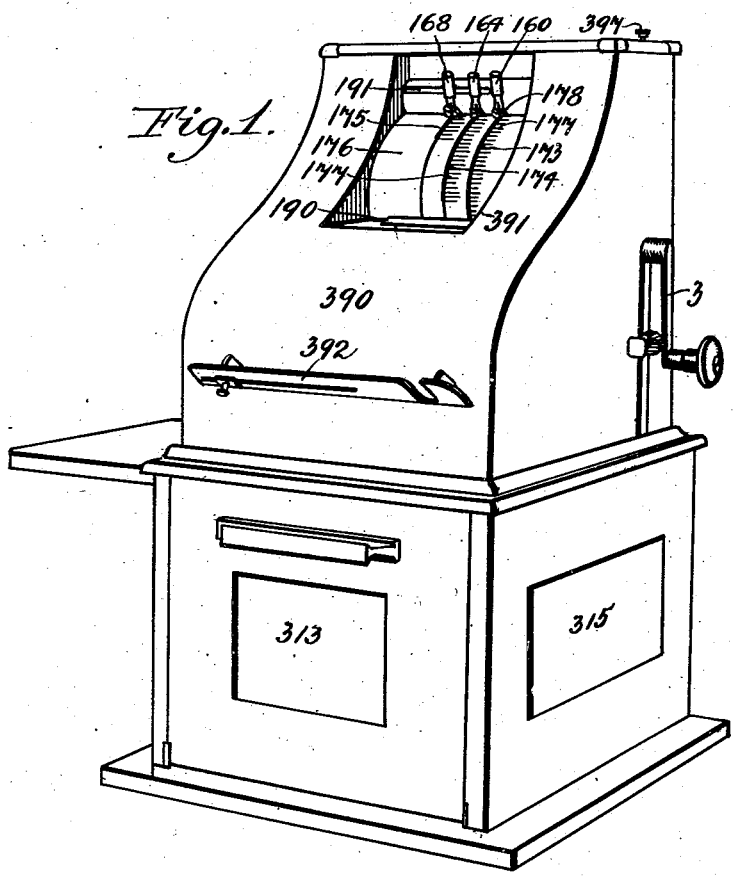

E. MOSS.
STAMPING OR FRANKING MACHINE.
APPLICATION FILED APR. 1, 1915.

1,196,968.

Patented Sept. 5, 1916.
10 SHEETS—SHEET 1.

INVENTOR:
Ernest Moss

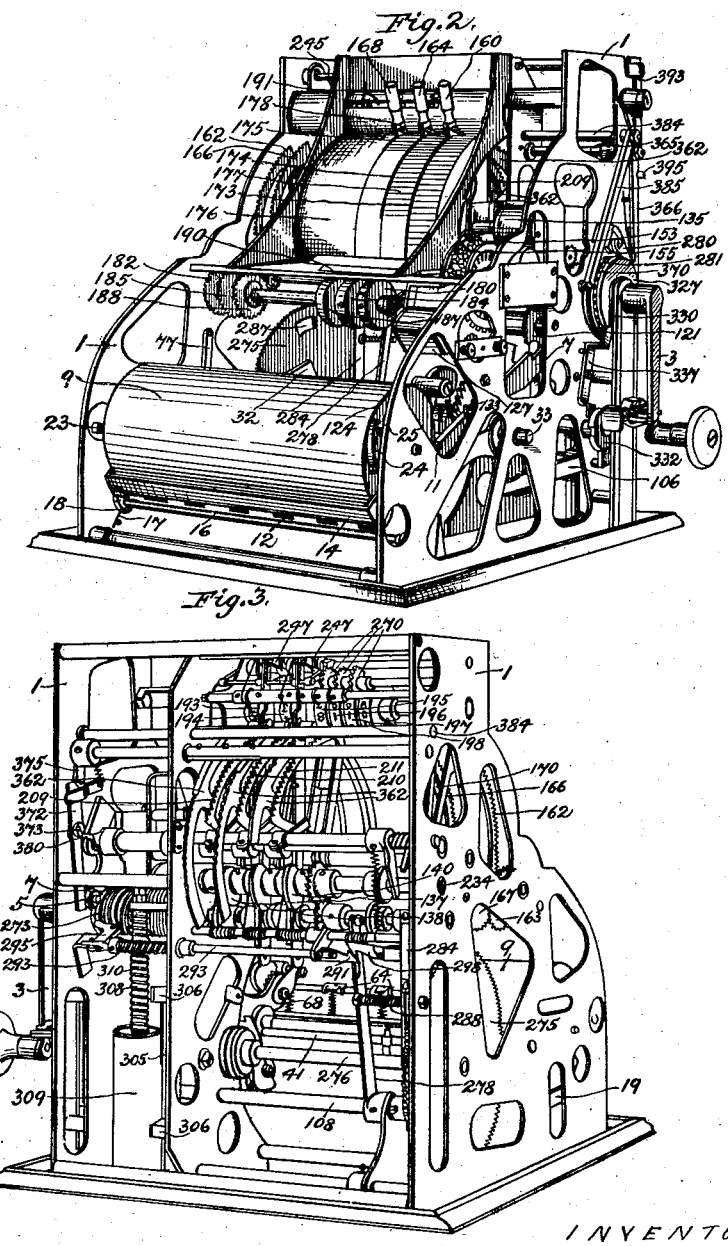

E. MOSS.
STAMPING OR FRANKING MACHINE.
APPLICATION FILED APR. 1, 1915.
1,196,968.
Patented Sept. 5, 1916.
10 SHEETS—SHEET 3.
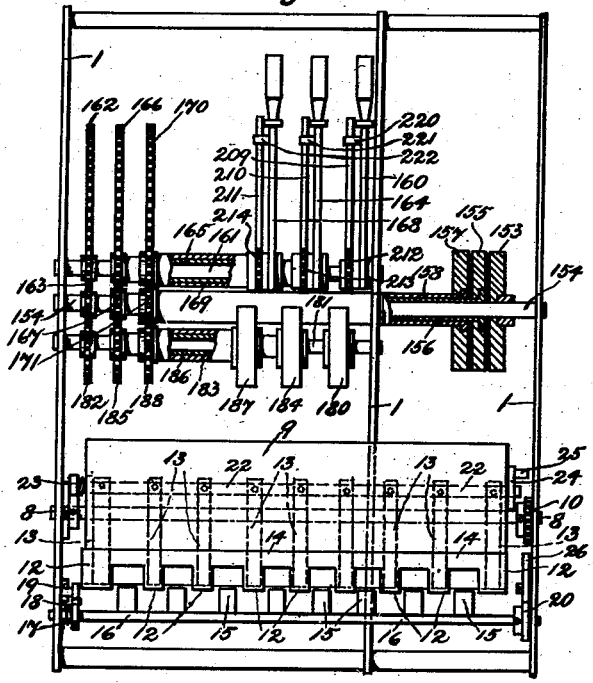
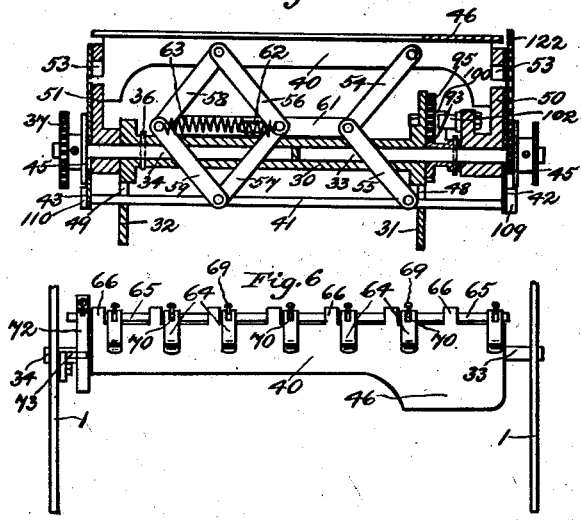
INVENTOR:
Ernest Moss

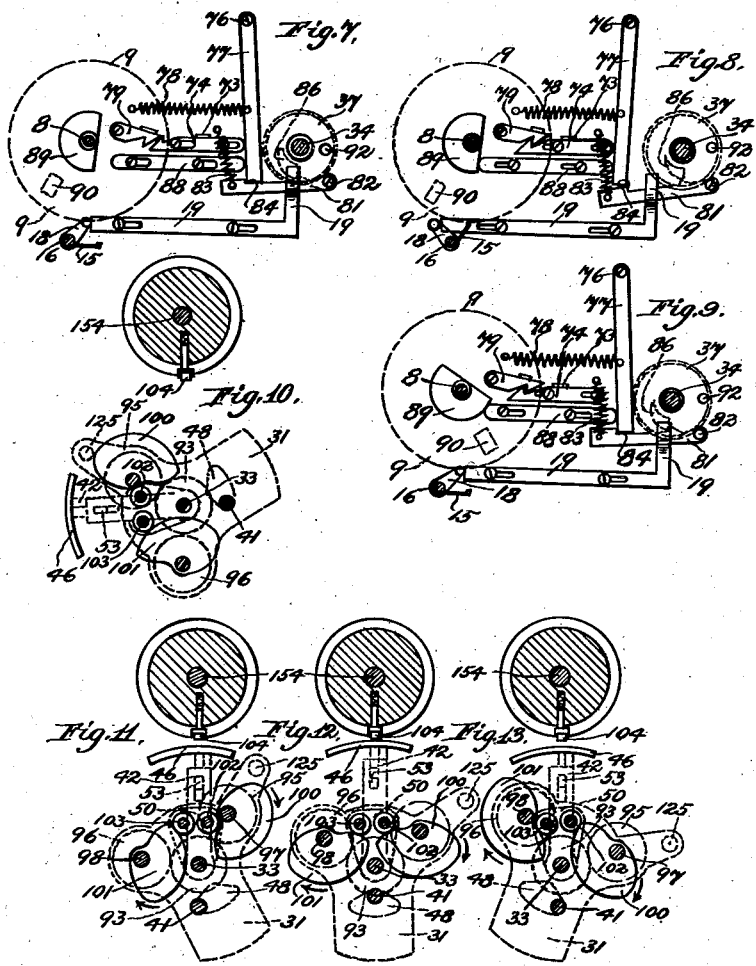

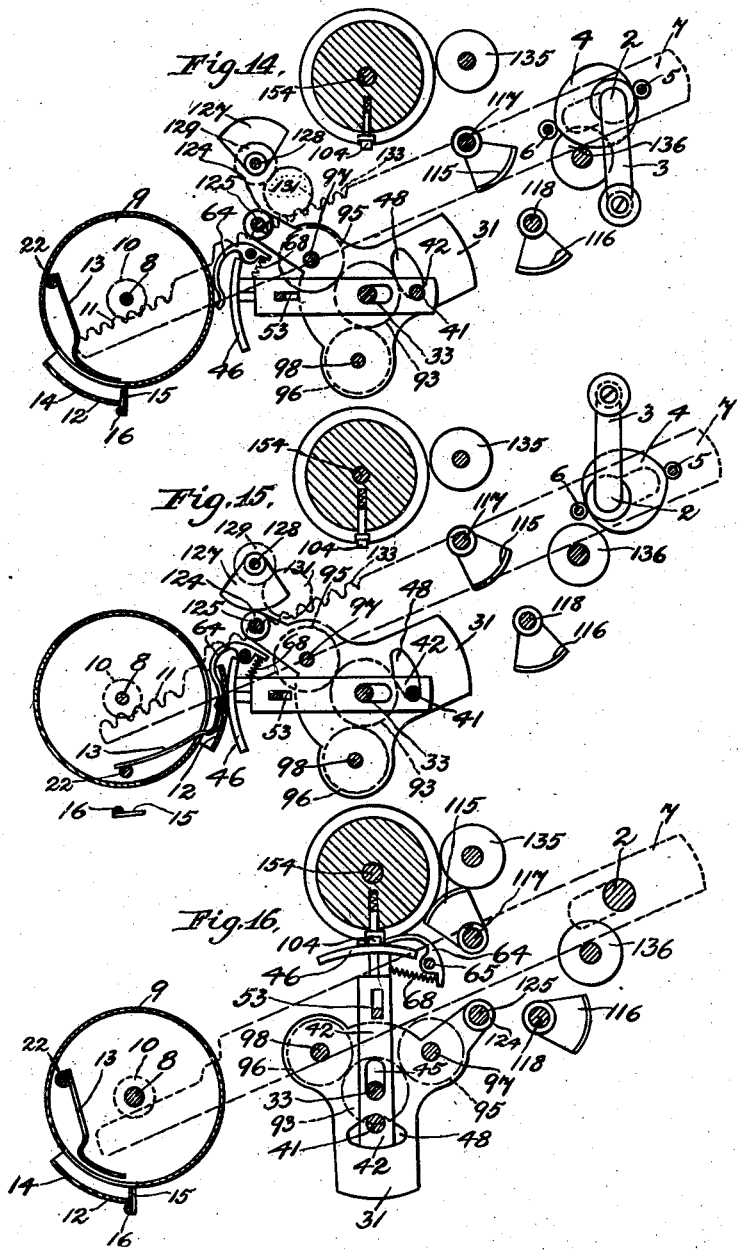

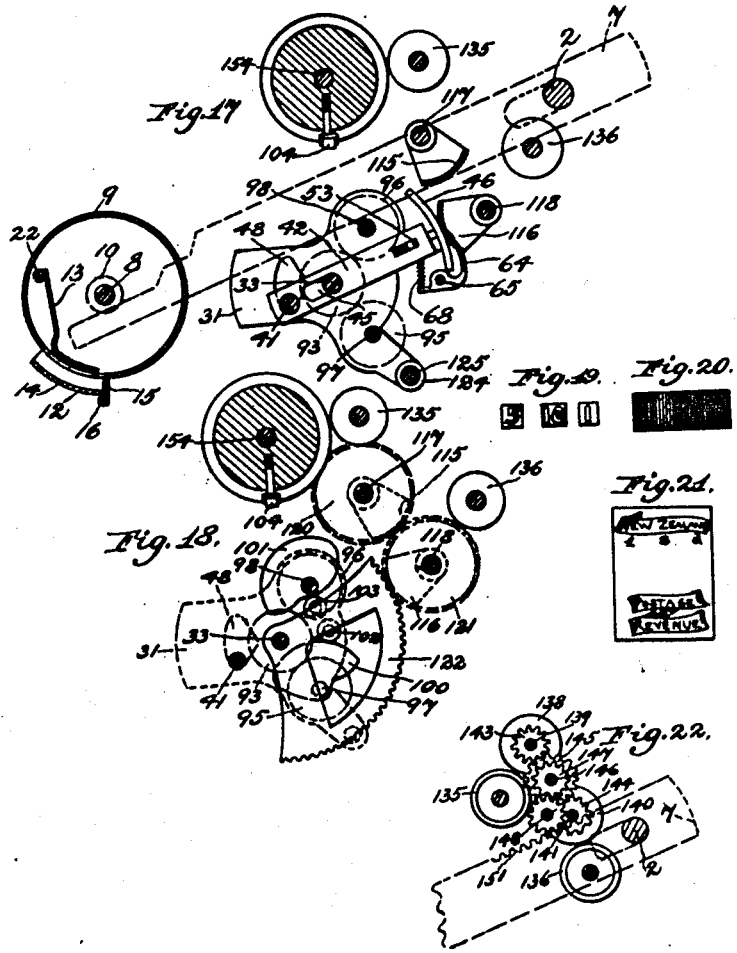

E. MOSS.
STAMPING OR FRANKING MACHINE.
APPLICATION FILED APR. 1, 1915.

1,196,968.

Patented Sept. 5, 1916.
10 SHEETS—SHEET 7.

INVENTOR:
Ernest Moss

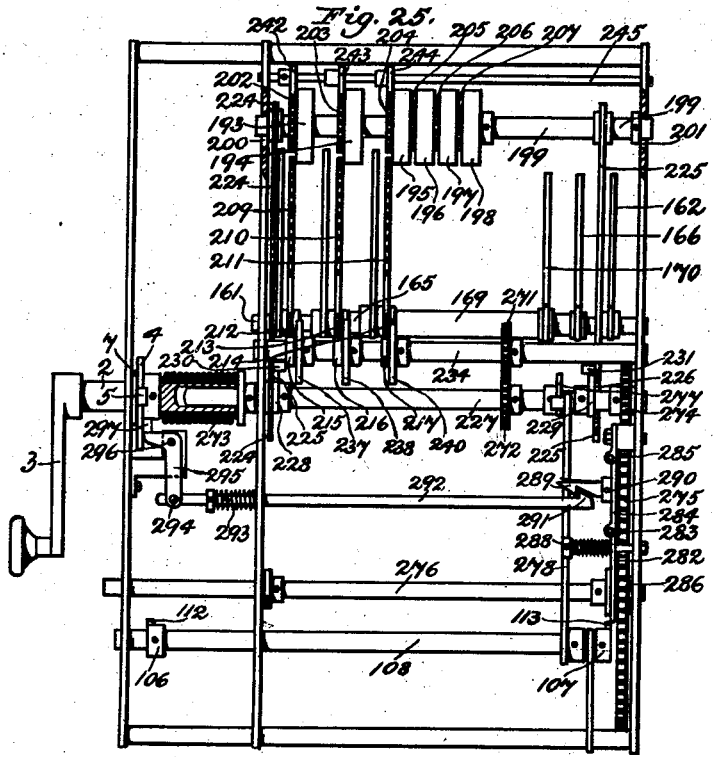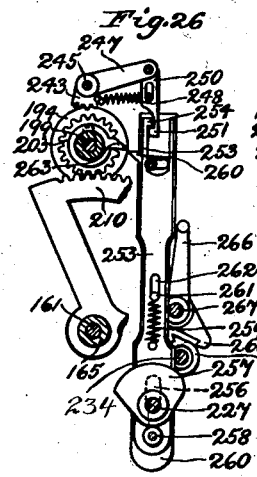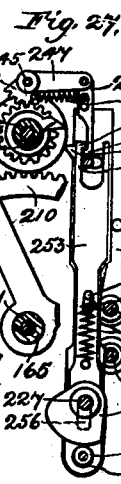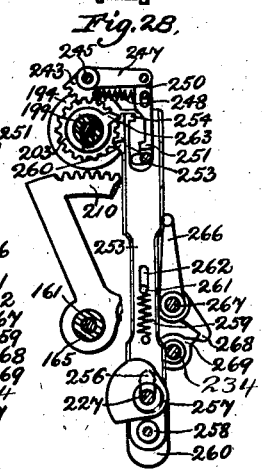

E. MOSS.
STAMPING OR FRANKING MACHINE.
APPLICATION FILED APR. 1, 1915.
1,196,968.
Patented Sept. 5, 1916.
10 SHEETS—SHEET 9.
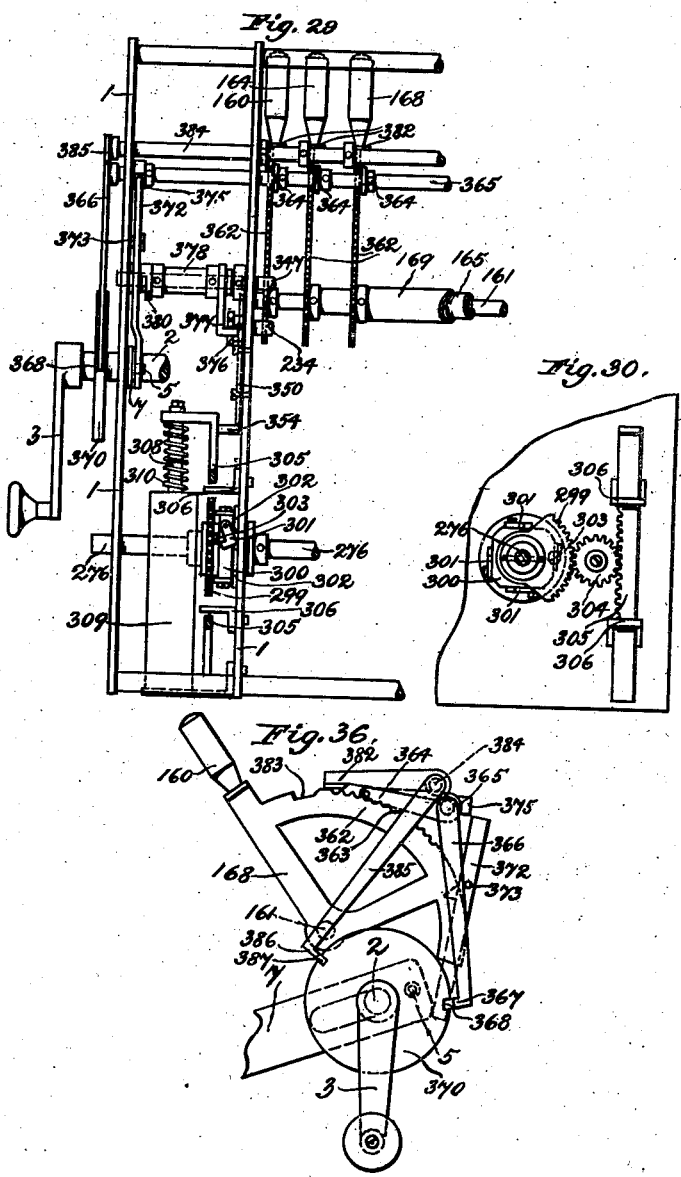
INVENTOR:
Ernest Moss

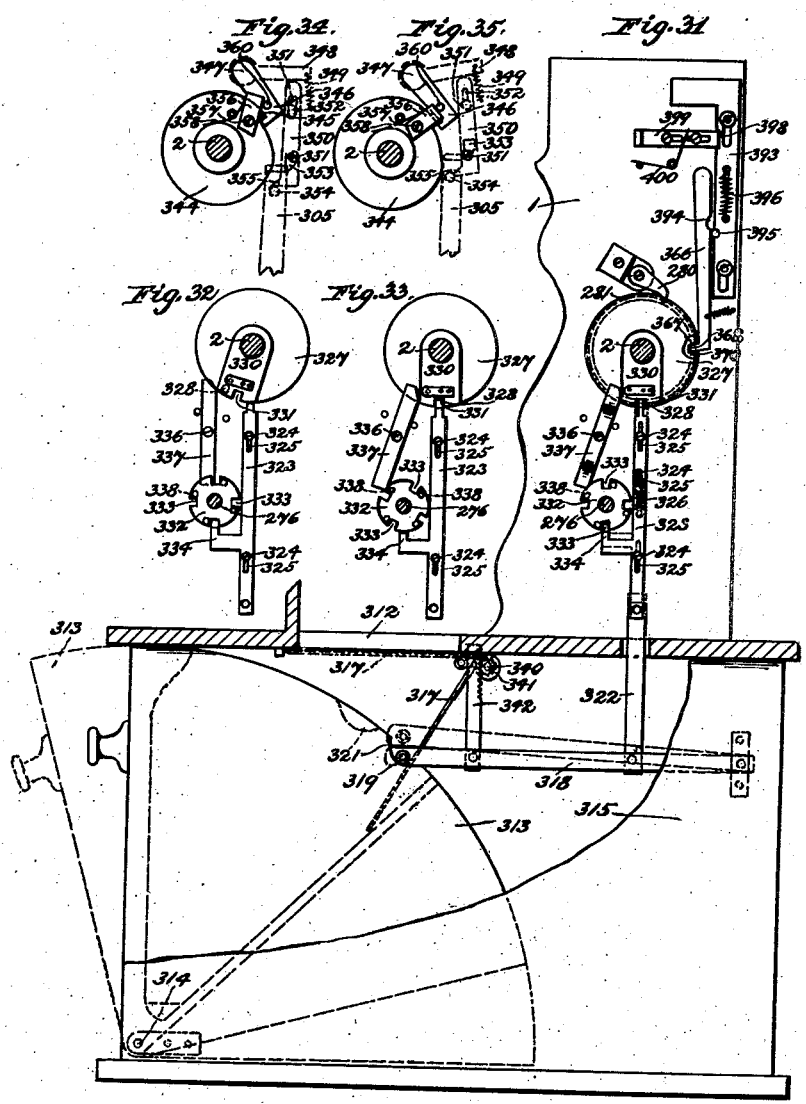

UNITED STATES PATENT OFFICE.

ERNEST MOSS, OF DALLINGTON, CHRISTCHURCH, NEW ZEALAND.

STAMPING OR FRANKING MACHINE.

1,196,968.  Specification of Letters Patent.  Patented Sept. 5, 1916.

Application filed April 1, 1915. Serial No. 18,577.

*To all whom it may concern:*

Be it known that I, ERNEST MOSS, a subject of the King of Great Britain, residing at 486 Retreat road, Dallington, Christchurch, in the Dominion of New Zealand, have invented new and useful Improvements in Stamping or Franking Machines, of which the following is a specification.

This invention relates to franking machines; that is to say, machines for stamping letters, telegrams, documents and generally for use in lieu of the affixing of adhesive stamps for the prepayment of the cost of transmission or of the amount of duty levied thereon.

The objects of the present invention are chiefly:—to provide a machine from which it will be impossible to obtain an impression or frank without causing the machine to record the face value of such frank; and, secondly to provide a machine capable of supplying franks of a great range or variety of denominations or values.

With these and other objects in view the construction includes the following features:—(a) Means for receiving the matter to be stamped and for forwarding such matter to the stamping mechanism, which latter is positioned at an inaccessible point within the interior of the machine. (b) Means for stamping or impressing the matter with the desired denomination or value. (c) Means for completing the frank by impressing or stamping the matter with any additional letterpress, symbols, figures, devices or the like. (d) Means for inking the dies. (e) Means for effecting the selection of the desired value or denomination of the frank, and including means for causing such selection, when made, to be visible from the exterior of the machine. (f) Means whereby the operation of the mechanism for the purpose of effecting the stamping or impressing of the matter will automatically cause the value of the frank so supplied, to be recorded and the value of each subsequent frank as it is supplied to be added to the total of such record. (g) Means whereby the stamping, registering and recording mechanisms are actuated automatically, at a certain required speed, thus avoiding the possibility of inaccuracies in the working of such mechanisms as might be occasioned by varying the speed of operation. (h) Means whereby the various parts and mechanisms will be automatically locked from action except when required to perform their functions in the manner, relationship, and sequence intended.

In order that the nature of the invention and its construction may be fully understood, reference will now be made to the accompanying drawings in which:—

Figure 1 is a perspective view of the machine as a whole with the cover in position. Fig. 2 is a similar view of the machine with the cover removed. Fig. 3 is a perspective view of the machine as viewed from the rear. Fig. 4 is a front elevation showing the means for receiving the matter to be franked, and also the means for selecting and displaying the value of the frank. Fig. 5 is a front elevation of the means for carrying the matter during the stamping by the dies, some of the parts being shown in section in order to make the construction clear. Fig. 6 is a face view of the upper side of the construction shown in Fig. 5, and illustrating the means for receiving and retaining the matter thereon. Figs. 7, 8 and 9 are three detail views showing the operation of the means employed for controlling the grippers of Fig. 6 and certain other parts coöperating therewith. Figs. 10, 11, 12 and 13 are a series of diagrammatic views illustrating the successive stages in the operation of the means shown in Fig. 5 for carrying the matter during stamping. Figs. 14 and 15 are diagrammatic views illustrating the operation of the means for receiving and forwarding the matter to the stamping mechanism and showing also the means for inking the denomination dies. Fig. 16 is a somewhat similar diagrammatic view showing the positions of the parts at the moment at which the matter comes in contact with the denomination dies. Fig. 17 is a similar view to Fig. 16 but showing the positions when the matter is in contact with one of the supplementary dies. Fig. 18 is a diagrammatic view showing the means employed for bringing the supplementary dies into operation. Fig. 19 illustrates an impression of the denomination dies. Figs. 20 and 21 show, for example, impressions of two supplementary dies employed for stamping the matter in conjunction with the denomination dies so as to complete the frank. Fig.

Figure 23:
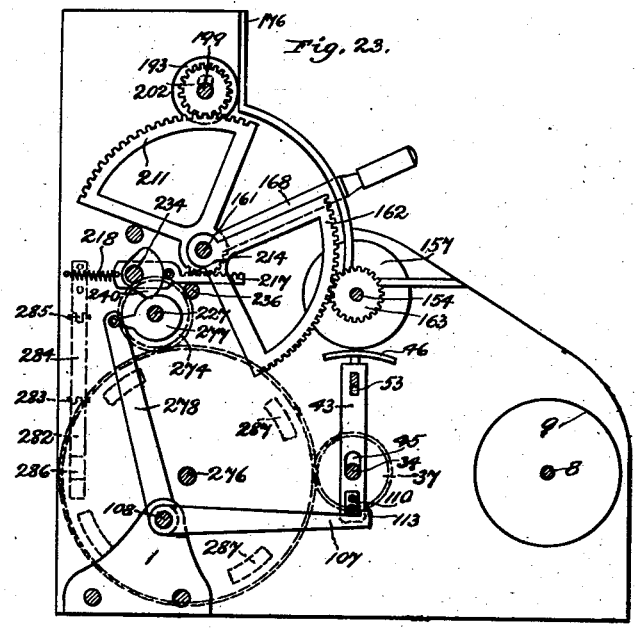
Figure 24:
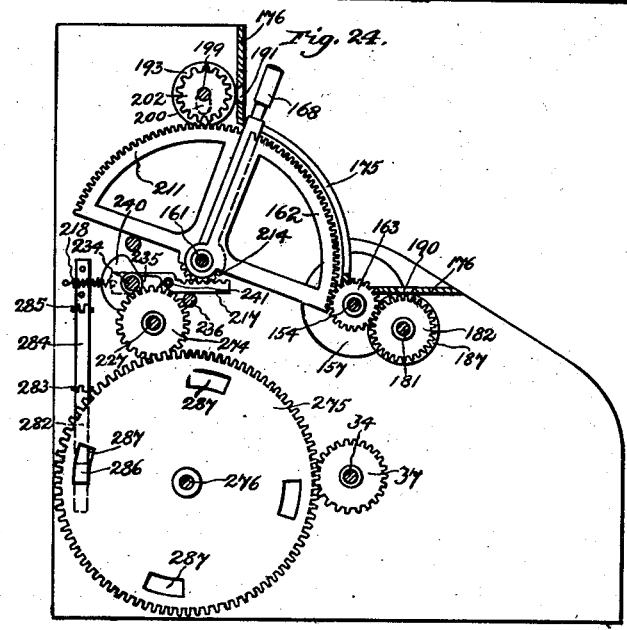

22 shows the means employed for actuating the inking means for the supplementary dies. Fig. 23 is an end elevation showing the means employed for bringing the matter into contact with the denomination dies, the means for operating such dies, and the means for causing the value of the frank to be recorded. Fig. 24 is a similar view illustrating the method of driving the means for carrying the matter and for actuating the recording means. Fig. 25 is a rear elevation of the machine showing the means employed for actuating certain parts of the machine automatically by means of a spring, and showing also the recording means. Figs. 26, 27 and 28 are detail views illustrating the successive movements of the transferring mechanism of the recorder. Fig. 29 is a part rear elevation of the machine showing the means for governing the speed of the machine when operated by means of the spring and showing also the means for interlocking the denomination levers and the operating handle of the machine. Fig. 30 is a detail view showing the means for connecting the governing means with the mechanism of the machine. Fig. 31 is a side elevation showing the cabinet (partly broken away) and the receptacle into which the matter is dropped by the machine upon the completion of franking and illustrating the means for effecting the interlocking of such receptacle with the operating handle of the machine. Figs. 32 and 33 are detail views illustrating two successive stages of such locking means during the rotation of the operating handle. Figs. 34 and 35 are detail views illustrating the means for preventing the operating handle from being twice turned during one operation of the machine, and, Fig. 36 is a detail view of the means for interlocking the denomination levers and the operating handle of the machine.

The said construction comprises a suitable framework 1 wherein is revolubly mounted a horizontal shaft 2 provided upon its outer projecting end with a crank or handle 3 by means of which it may be rotated.

Keyed upon the shaft 2 is a cam 4 adapted to engage a pair of pins or rollers 5 and 6 mounted upon a slidable rod 7 for the purpose of causing such rod to perform a reciprocal movement during one revolution of the shaft 2.

Revolubly mounted upon a horizontal axis 8 in the front portion of the frame 1 is a cylinder 9 provided at one end with a pinion 10 adapted to intermesh with the teeth of a rack 11 formed in the lower portion of the said rod 7, the arrangement being such that the said reciprocal movement of the rod will cause the cylinder to turn axially through a portion of a revolution and return again to its original position. The said cylinder, which will hereinafter be termed the "forwarding-cylinder," is adapted to receive the matter to be franked and to forward such matter to the stamping mechanism. For this purpose such cylinder 9 is provided at the required point upon its periphery with a longitudinally disposed set of fixed grippers 12 (Figs. 2 and 4) with which are adapted to co-act a corresponding set of mechanical grippers 13, by which term is meant grippers operated mechanically by the machine to cause them to open or close. The fixed grippers are preferably mounted upon a guard 14 which is carried upon the cylinder and longitudinally disposed a slight distance from the periphery thereof. By this arrangement the interval between the periphery of the cylinder and the guard constitutes a gage for determining the maximum thickness of the matter capable of being dealt with or franked by the machine. The matter to be franked is inserted between the said guard and the periphery of the cylinder and rests upon a line of stops 15. The cylinder is then rotated through a portion of a revolution as previously mentioned, during which the stops 15 are automatically moved out of range of the matter and the latter gripped between the fixed and mechanical grippers. The said stops 15 are mounted upon a common spindle 16 horizontally disposed across the framework 1 at the required position, such spindle being provided with a spring 17 which tends to carry the stops into the out-of-range position. To cause the said stops to be brought into the set or operative position to receive the matter as above mentioned, the said spindle is provided at one end with an arm 18 adapted to be engaged by the end of a rod 19 slidably mounted upon the framework 1 and actuated by the means hereinafter described, while to retain it in such position against the tendency of the spring 17, the spindle 16 is provided at its other end with a notched or ratchet wheel 20 adapted to be engaged by a suitable pawl. Upon the turning of the handle 3 being commenced, however, the lower end of the rod 7 comes in contact with and disengages the said pawl from the wheel 20 thus permitting the spring 17 to carry the stops into the out-of-range position. The said mechanical grippers 13 are mounted upon a common spindle 22 longitudinally disposed within the periphery of the cylinder 9. A suitable spring 23 is provided to normally maintain the grippers 13 in the closed or engaged position, while to cause such grippers to open or disengage the matter when required, the said spindle 22 is provided with an arm 24 by means of which it may be turned, such arm having a pin or projection 25 adapted to engage with the periphery of a stationary cam-plate 26 carried upon the framework 1 so as to operate the said grippers 13 as required during the turning of the cylinder 9. The said cylinder 9, upon arriving at the limit of its turning movement, delivers the matter to the mechanism about to be described, and which serves to cause such matter to come in contact with and be impressed with the dies. The said mechanism includes what is hereinafter termed the "platen-drum" (Fig. 5) and comprising a sleeve 30 upon the ends of which are mounted a pair of end-plates 31 and 32. The said platen-drum is revolubly mounted upon a horizontal axis which is divided at or near the middle of its length so as to provide a stationary axle 33 secured at its outer end to the framework 1 and upon which axle the sleeve 30 will be free to rotate, and a live portion 34 adapted to revolve in a suitable bearing provided in the framework 1. The said live portion 34 of the axis is keyed, as by means of a pin 36 to the sleeve 30, while upon the outer end of such live portion 34 is keyed a pinion 37 by means of which the platen-drum may be rotated.

Mounted in conjunction with and upon the same axis as the platen-drum, is what will be termed the "platen-carrying-member" comprising a rectangular framework upon which is carried a platen, such framework being adapted to receive the matter from the cylinder 9 and by means of its platen to present such matter to the dies. For this purpose the said platen-carrying-member, is adapted to rotate with the platen-drum. At the required point in such rotation, however, the platen-carrying-member is adapted to desist from its rotary movement with the platen drum and to move so as to carry the platen outward in a radial direction from the axis in order that such platen may cause the matter to come in contact with and be impressed by the denomination dies, after which the platen-carrying-member returns to its inward position and continues its rotation with the platen-drum.

In construction the platen-carrying-member comprises two longitudinal bars 40 and 41 positioned one on either side of and parallel with the said drum axis and a pair of end members 42 and 43 each formed with a slot 45 through which the said axis passes. Upon the bar 40 is mounted a platen 46 while the other bar 41 is adapted to pass through slots 48 and 49 in the drum ends 31 and 32 respectively. The said end members 42 and 43 are adapted to slide in a radial direction upon arms 50 and 51 which latter are formed with bosses revoluble upon the said drum axis.

In order to allow of the platen accommodating itself to stamp various thicknesses of matter, the bar 40 is resiliently arranged in relation to the other portions of the platen-carrying-member. For this purpose the ends of the bar 40 are slidably arranged in slots 53 formed in the end members 42 and 43, while to maintain the bar normally outward, at the limit allowed by the slots, such bar is connected with the bar 41 by means of three or more pairs of toggle-arms 54, 55, 56, 57, 58 and 59. The center pivot of the arms 54—55 is coupled, by means of a link 61, with the corresponding pivot of the arms 58—59, while the center pivot of the arms 56—57 is adapted to slide in a longitudinal slot 62 formed in such link. By this construction a true parallel movement of the bar 40 is obtained, while to provide the required outward tendency of such bar, a tension spring, or pair, of springs 63 are employed to connect the center pivots of the arms 56—57 and 58—59.

To enable it to receive and hold the matter during the stamping, the bar 40 (Fig. 6), is provided along its outer face or periphery with a series of grippers 64, which are loosely mounted upon a common spindle 65 revolubly mounted in bearings 66 upon the bar 40. The closing of the said grippers is effected by means of springs 68 (one for each) (Figs. 14, 15, 16 and 17), so as to provide for the independent closing of each individual gripper in order to allow for varying thicknesses of the matter dealt with. The opening of the gripper is effected by turning the said spindle 65 for which purpose the latter is provided with a series of pins 69 (one for each of the grippers) and adapted to pass through slots 70 in such grippers. To cause it to be turned the spindle 65 is provided with an arm 72 which is adapted to be engaged by a projection 73 provided upon a plate 74 (Figs. 7, 8 and 9) slidably mounted upon the frame work 1. Pivoted also upon the said framework 1, as at 76, is one end of a lever 77 which is controlled by a spring 78 which tends to cause such lever to engage the end of the plate 74 and carry the latter forward, in which position it is retained by reason of a dog upon its forward end being engaged by a detent 79 pivoted at the required point upon the framework 1. To prevent this action from taking place except at the stage in the operation at which the grippers require to be opened to release the matter after franking and to receive fresh matter, a lever 81 is provided, pivoted as at 82, upon the framework, and held upward by means of a spring 83. The said lever is formed with a shoulder 84 adapted to engage the lower end of the lever 77 and retain the latter against the tendency of its spring 78.

As the platen-drum completes its revolution, a projection or cam 86 upon the side of the pinion 37 comes into engagement with and depresses the lever 81 (as in Fig. 8), thereby permitting the lever 77 to open the grippers in the manner above described.

To effect the closing of the grippers, that is to say, releasing them from the restraint of the projection 73 and so permitting them to close under action of their springs 68, a rod 88 is slidably mounted at the required point upon the framework 1, one end of such rod being adapted to be engaged by a cam 89 carried upon the forwarding cylinder 9 in such a manner as to cause the other end of such rod to carry the lever 77 clear of the plate 74, in which position the lever is maintained by the shoulder 84 (as in Fig. 9).

During the movement of the cylinder 9 in forwarding the matter, the cam 89 comes into operation and thus relieves the grippers from the spring 78. The grippers are therefore at this stage held open by the engagement of the plate 74 with the detent 79. As the cylinder 9 completes its forwarding movement, however, a block or projection 90, carried upon the end of such cylinder, comes in contact with and disengages the detent 79 from the plate 74 thus permitting the grippers 64 to close under the action of their springs 68 and so firmly hold the matter upon the platen and its carrying member during the stamping operation.

During the rotation of the platen-drum also a pin or projection 92 upon the side of the pinion 37, comes in contact with and operates the sliding rod 19 thereby restoring the stops 15 to the set position in readiness to receive the next lot of matter.

The means for controlling the platen-carrying-member, so as to cause the latter to revolve with the platen-drum and to desist from such rotation at the point at which the platen is required to perform its outward movement, as before-mentioned, include a sun-wheel 93 (Fig. 5 and Figs. 10 to 18), keyed upon the stationary axle 33, and with which wheel 93 are adapted to intermesh two planet-wheels 95 and 96, revolubly mounted upon axes 97 and 98 respectively carried upon the drum end 31. The said wheels 95 and 96 are provided with cams 100 and 101 respectively of the required formation and adapted to engage two pins or rollers 102 and 103 respectively mounted upon the boss of the arm 50.

By this arrangement the rotation of the platen-drum, will, by reason of the intermeshing of the stationary sun-wheel 93 with the planet-wheels 95 and 96, cause the latter to revolve. At the commencement of the rotation of the platen-drum (as shown in Fig. 10) the cam 101 will so engage the pin 103 as to cause the platen-carrying-member to revolve with the platen-drum. As the rotation of the platen-drum and the consequent rotation of the cams 100 and 101 continues, the platen-carrying-member will, by the operation of such cams upon the pins 102 and 103, be caused to continue its rotation with the platen-drum. At the point in such rotation at which the platen is directly beneath the denomination dies 104 (as in Fig. 11) the cams 100 and 101 have arrived, in the course of their individual rotations, at such positions that their operation upon the pins 102 and 103 will cause the platen-carrying-member to come to a standstill at this position while the platen-drum continues its rotation.

While in this position the platen-carrying-member is caused to perform its outward movement so as to cause the platen to bring the matter into contact with the denomination dies, the impression made being as shown in Fig. 19. For this purpose a pair of levers or arms 106 and 107 (Figs. 23 and 25) are provided and keyed upon a horizontal shaft 108, mounted in bearings in the framework 1. At this stage in the operation, the levers 106 and 107 are caused by the shaft 108 to turn so as to engage the end members 42 and 43 respectively and so raise the platen-carrying-member in the required manner to cause the platen to bring the matter into contact with the denomination dies 104. To assist the said cams 100 and 101 in arresting the rotation of the platen-carrying-member and to insure the latter being in the correct position at the moment of performing its said outward movement, the end-members 42 and 43 are provided with projections 109 and 110 respectively (Figs. 5 and 23) by means of which the levers 106 and 107 engage such ends and the said levers are formed near their extremities with shoulders 112 and 113 respectively adapted to come in contact with the forward faces of such projections 109 and 110, as shown in Fig. 23.

The outward movement of the platen, and the consequent printing of the value or denomination upon the matter, having been thus performed, the levers 106 and 107 are restored by the machine to their original position, thus permitting the platen-carrying-member also to return to its former position in relation to the drum-axis.

Meanwhile the continuous rotation of the platen-drum and the consequent rotation of the cams 100 and 101, caused the latter at the moment at which the stamping was performed, to assume the positions shown in Fig. 12, in which position neither of such cams exert any influence upon the platen-carrying-member. By the time the platen-carrying-member has returned to its normal position, however, the cams have assumed the positions shown in Fig. 13. In this position the cam 101 so engages the pin 103 as to cause the platen-carrying-member to resume its rotation with the platen-drum and with which it completes its revolution.

The matter, after coming in contact with the denomination dies, as above-mentioned, bears an imprint representing the value only, as illustrated in Fig. 19. In order therefore to complete the frank by impressing or stamping the matter with some additional letterpress, symbols, figures, devices, or the like (Figs. 20 and 21) one or more dies are employed and adapted to come into operation as hereinafter described.

As here shown (Figs. 14 to 18) two dies 115 and 116, of segmental form, are employed and revolubly mounted upon axes 117 and 118 respectively, carried upon the framework 1. The said dies are so disposed around the path described by the platen, that, as the latter completes its revolution, it will cause the matter to come in contact with and so be impressed by the said dies successively. To cause the dies 115 and 116 to come into the operative position so as to present their peripheries to the matter as the platen arrives at the required position, such dies (Fig. 18) are provided with pinions 120 and 121 respectively adapted to intermesh with a quadrant 122 carried upon the boss of the arm 50 of the platen-carrying-member, so that, as the latter revolves, it will bring the dies into their operative positions at the required moment. As here shown the operation of the supplementary dies takes place subsequently to the impression by the denomination dies, but obviously, by a slight re-arrangement, such supplementary dies may be caused to come into operation first. The impressions made by the dies may be as shown in Figs. 20 and 21.

The inking of all the dies is effected by means of ink-rollers (one for each) revolubly mounted and each adapted to receive a supply of ink from a separate rotatable ink-pad and to transfer the ink so obtained, to its particular set of dies, previous to the impression of the latter, as hereinbefore described.

To effect the inking of the denomination dies 104 an ink-roller 124 (Figs. 14 and 15) is provided and is revolubly mounted upon a spindle 125 carried upon the end 31 of the platen-drum at such a position that such roller will come in contact with and pass across the dies, previous to their impression upon the matter. While the platen-drum is in position, ready to receive the matter, the said ink-roller projects in a forwardly direction therefrom and in which position it receives a supply of ink during the operation of the drum 9 in forwarding the matter. For this purpose an ink-pad 127, of segmental form, is provided and revolubly mounted upon an axis, 128 carried upon the framework at such a position, that, as such ink-pad is revolved, its periphery will come in contact with the ink-roller 124. To effect this rotation the said ink-pad 127 is provided with a pinion 129 adapted to intermesh with a pinion 131 revolubly mounted upon an axis carried upon the framework 1, such pinion 131 being adapted to intermesh with rack-teeth 133 formed upon the sliding rod, 7. By this arrangement the movement of the sliding rod 7, in turning the cylinder 9 so as to forward the matter, as hereinbefore mentioned, serves also to rotate the ink-pad 127 and so supply ink to the roller 124.

The die 115 as it is brought into position by the quadrant 122 to impress the matter, as hereinbefore mentioned, comes in contact with and receives a supply of ink from an ink-roller 135 (Figs. 14, 15 and 16) revolubly mounted upon the framework and similarly, the die 116, as it is brought into operation by the same means, comes in contact with and receives ink from an ink-roller 136, also revolubly mounted upon the said framework 1.

To supply ink to the roller 135 a cylindrical ink-pad 138 (Fig. 22) is provided and revolubly mounted upon an axis 139 positioned upon the framework 1 at such a point that the peripheries of such roller and ink-pad will be in contact, and, in a similar manner, a second ink-pad 140 is provided upon an axis 141 so as to supply ink to the roller 136. To effect the rotation of the said ink-pads, to insure the supply of fresh ink to the dies at each operation of the latter, the ink-pad 138 is provided with a pinion 143 and similarly the ink-pad 140 is provided with a pinion 144 both of which pinions are adapted to intermesh with a spur-wheel 145. The spur-wheel 145 is mounted upon a spindle 146 carried in bearing in the framework 1 and is provided with a pinion 147 adapted to intermesh with a second pinion 148 revolubly mounted upon the framework 1 and adapted to intermesh with rack-teeth 151, formed in the sliding rod 7. Thus, as the sliding rod operates the forwarding cylinder 9, so as to cause the latter to forward the matter, the same movement will also serve to supply the ink-rollers 135 and 136 with ink in readiness to ink their respective dies 115 and 116.

In lieu of the use of ink, each roller may be supplied with a different chemical so that the color or colors of the completed frank will be produced synthetically by the superimposing of the successive impressions.

The denomination dies 104 consist of a series of disks mounted side by side and adapted to independent rotation, such disks being provided around their peripheries with dies or stamps adapted to print numbers or signs to represent values. Thus in the case of a machine as here shown for use with English currency, the denomination dies will consist of a pence disk 153 (Fig. 4) keyed upon a horizontal spindle 154 revolubly mounted in the framework, a shillings disk 155 keyed upon a sleeve 156 revolubly mounted upon the said spindle 154, and a pounds disk 157 keyed upon a sleeve 158 revoluble upon the said sleeve 156.

For selecting the different denominations, i. e., for adjusting the denomination dies so as to bring the desired figures into the operative position to impress the matter, a series of hand levers, of a similar number to the disks of the denomination dies, are provided, the handle portions of such levers being adapted to project outwardly from the exterior of the case of the machine. Thus in the machine as here shown, to operate the pence disk 153 a pence lever 160 is provided and keyed upon a horizontal spindle 161 revolubly mounted in the framework, such spindle 161 having keyed upon it a quadrant 162 adapted to intermesh with a pinion 163 keyed upon the spindle 154. To operate the shillings disk 155 a similar lever 164 is provided and keyed upon a sleeve 165 revoluble upon the spindle 161 and upon which sleeve 165 is keyed also a quadrant 166 adapted to intermesh with a pinion 167 keyed upon the sleeve 156. Again to operate the pounds disk 157 a similar lever 168 is provided and keyed upon a sleeve 169 revoluble upon the sleeve 165 and upon which sleeve 169 is keyed a quadrant 170 adapted to intermesh with a pinion 171 keyed upon the sleeve 158.

In order to enable them to be operated from the exterior of the machine, the outer or handle portions of the levers 160, 164 and 168 are so arranged as to project through slots 173, 174 and 175 respectively formed in a plate 176, which constitutes a portion of the case of the machine, as shown in Figs. 1 and 2.

To enable the setting of the disks of the denomination dies to be conveniently performed by the said levers, the portions of the plate 176 adjacent to each of the said slots are provided with graduations 177, while the levers themselves are provided with pointers or the like 178 adapted to register with such graduations. By this arrangement the turning of a lever so as to cause its pointer to register with a certain figure upon the graduation 177 will serve to operate the corresponding disk of the denomination dies as to bring a like figure into the operative position upon the latter.

Provision is made for rendering the value, when selected in the above described manner by the manipulation of the levers, clearly visible from the exterior of the machine, in order that, should an error have occurred, the same may be rectified before the operating handle of the machine is turned. For this purpose a disk 180 (Figs. 2 and 4) bearing around its periphery a series of figures identical with those of the pence disk 153, is provided and keyed upon a horizontal spindle 181 revolubly mounted upon the framework 1, such spindle also having keyed upon it a pinion 182 adapted to intermesh with the pinion 163. Revoluble upon the spindle 181, is a sleeve 183 upon which is keyed a similar disk 184, bearing around its periphery a series of figures corresponding with those of the disk 155 of the denomination dies, while upon such sleeve 183, is keyed also a pinion 185, adapted to intermesh with the pinion 167. Revoluble again upon the sleeve 183, is a sleeve 186, upon which is keyed a similar disk 187, bearing around its periphery a series of figures corresponding with those of the disk 157 of the denomination dies, such sleeve 186 having also keyed upon it a pinion 188, adapted to intermesh with the pinion 171. By this arrangement, the operation of turning the disks 153, 155 and 157 of the denomination dies, so as to bring the desired figures into the operative position, will serve also to so adjust the disk 180, 184 and 187 as to cause the latter to display the same figures beneath a glazed slot or opening 190 in the plate 176.

The recording means comprises a series of disks bearing a series of figures which as such disks are revolved will be brought into view behind a glazed slot or opening 191 formed in the plate 176, in order to indicate the total value of the franks supplied by the machine.

In the machine as here shown and designed for use with English currency there is a pence disk 193 (Figs. 23, 24 and 25), the graduations of which run from 0 or zero and increase by ½-penny up to 11 pence ½-penny, a shilling disk 194 graduated in shillings from 0 or zero to 19 shillings, and four pounds disks 195, 196, 197 and 198 respectively, each graduated from 0 or zero to 9. The said disks are each independently revoluble upon a common axis 199, which latter is floatably mounted in vertical slots 200 and 201, in the framework 1. The said disks 193, 194, 195, 196, 197 and 198 are provided with pinions 202, 203, 204, 205, 206 and 207 respectively, by means of which such disks are operated.

Adapted to intermesh with the pinions 202, 203, and 204 respectively, when the axis 199 is depressed in the slots, are quadrants 209, 210, and 211. The quadrant 209 cooperating with the pinion 202 is revolubly mounted upon the spindle 161, the quadrant 210, coöperating with the pinion 203, is revolubly mounted upon the sleeve 165 while the quadrant 211, coöperating with the pinion 204, is in a similar manner revolubly mounted upon the sleeve 169.

To enable them to be operated, the said quadrants 209, 210 and 211 are provided or formed with pinions, or pinion-segments, 212, 213, and 214 respectively. The said pinions are adapted to intermesh with rack-rods 215, 216, and 217, respectively, such rack-rods being slidably mounted and provided with springs 218 (one for each), which tend to draw their rods rearwardly, and consequently to turn their respective quadrants so as to project in a forward direction. Against this tendency the quadrants are controlled by their corresponding levers. For this purpose, upon the lever 160 (Fig. 4) is provided a pin or stop 220, adapted to engage the forward edge of the quadrant 209; upon the lever 164, is provided a pin or stop 221, adapted to engage the forward edge of the quadrant 210; and similarly, upon the lever 168, is provided a stop 222, adapted to engage the forward edge of the quadrant 211. By this arrangement, the tendency of the springs 218 will keep the quadrants in engagement with the said stops. Thus, for example, should the lever 160 be moved forward from its zero position for the purpose of selecting the denomination or value of the frank, as already explained, the quadrant 209, will, under action of the spring 218, move forward with such lever.

Before the operation of the machine is commenced the floating axis 199 is in its normal or upward position in the slots 200 and 201 (Fig. 25) in which condition the pinions 202, 203, and 204 will be out of range of the quadrants 209, 210, and 211. To control the said floating axis 199, two rods 224 and 225 are employed, such rods being connected at their upper ends with the said axis 199 while their lower ends project downwardly and are formed with slots 226, through which passes a horizontal spindle 227, rotatably mounted in bearings in the framework 1. Upon the said spindle are keyed two cams 228 and 229, the peripheries of which are adapted to engage pins or rollers 230 and 231, provided upon the said rods 224 and 225 respectively. By this arrangement, as the spindle 227 is turned, the cams will serve to raise the axis 199 or allow it to descend.

Upon the levers 160, 164, and 168 being operated, as required, before the operation of the machine is commenced, the corresponding quadrants 209, 210, and 211 will be advanced thereby, but in so doing, will not operate the pinions 202, 203, and 204, as the axis 199 is in the upward position. During the operation of the machine, however, the turning of the spindle 227, will permit the axis 199 to descend and so bring such pinions within range of the quadrants, which latter are then caused by the machine to leave their forward positions, in engagement with the stops 220, 221, and 222, and return to their original rearward positions, during which return movement the quadrants engage and turn such pinions and with them the disks 193, 194, and 195. The arrangement is such, that, the extent to which the pinions are rotated, will depend upon the extent to which the quadrants had been previously allowed to advance by the levers. Thus for example, should the pence lever 160 be set at three pence, the stop 220 will thereby be brought into such a position that it will permit the quadrant 209 to advance say six teeth, or, in other words, as many teeth as will be required to intermesh with the pinion 202, during the return movement of such quadrant, as to turn the disk 193 to that position at which it will show an additional three pence, to the amount previously displayed. To effect the said return movements of the rack-rods 215, 216, and 217 a horizontal shaft 234 is provided and revolubly mounted in bearings in the framework 1, such shaft being adapted to pass through slots 235 (Fig. 24), formed one in each of the said rack-rods and longitudinally therewith, while the forward portions of such rack-rods are supported by rollers 236, mounted in the framework 1. Keyed upon the said shaft 234, are three cams 237, 238, and 240, corresponding respectively with the rack-rods 215, 216, and 217, while to enable them to be operated by the said cams, each of such rack-rods is provided with a pin or roller 241, adapted to engage the forward side of the cam in each case. The arrangement is such, that, upon the shaft 234 being rotated, so as to cause the cams to present their greatest diameters to the pins 241, any of the quadrants 209, 210, and 211, which may have been previously allowed to advance by their respective levers, will, by the operation of their respective rack-rods and pinions, be caused to return to the normal or rearward position.

In order to guard against the counter disks 193, 194, and 195 being turned except under action of their corresponding quadrants, stops or teeth 242, 243, and 244 (Fig. 25) are arranged to intermesh respectively with the teeth of the pinions 202, 203, and 204, when the latter are in the upward position out of range of the quadrants 209, 210, and 211, as previously described. The mounting of the said stops 242, 243, and 244, comprises a horizontal bar, or fixed axis, 245, in the framework 1, and from which axis the said stops depend at the required positions, the stop 242 being keyed upon the axis, while the stops 243 and 244 are revoluble thereon, for a purpose hereinafter explained.

To effect the transferring when required, as for instance, from pence disk 193 to the shillings disk 194, when the amount of 12 pence has been reached, each of the stops 243 and 244 is provided with an arm or lever 247 and a spring 248 which serves to restore such stop to its normal position after being operated by the said lever. Connected with, so as to depend from the ends of the said levers (one for each), are links 250, each formed at its lower portion with a dog 251. Slidably mounted, adjacent to and virtually parallel with, the said links, are two rods 253 (one for each), which are formed in their upper portions with dogs 254, adapted to engage the dogs 251, for the purpose of drawing down the levers 247. During each operation of the machine, the rods 253 are caused to make one reciprocal movement up and down. For this purpose, each of the said rods is formed in its lower portion with a slot 256, through which the spindle 227 passes. Upon the spindle 227, are keyed two cams 257 (one for each of the rods) and which cams are adapted to engage pins or rollers 258 upon the lower ends of their respective rods, for the purpose of depressing the latter. To effect the upward movement of the said rods, suitable springs 259 are provided.

For the purpose of guiding the rods 253, so as to bring them within range of the links 250, when required, to permit of the dogs 254 engaging the dogs 251, two guide-plates 260 (one for each of the rods) are provided. Each of the said guide plates 260 is mounted, at its lower end, loosely upon the spindle 227, by the side of its respective rod and extends upward parallel therewith, while to provide the required connection, the said guide-plate is furnished with a pin 261, which is received within a slot 262 in the rod. When in their normal or forward positions, the guide-plates 260 maintain their rods 253 out of range of the respective links 250. To cause the said guide-plates to move slightly in a rearwardly direction and so bring their rods within range of the links, the pence disk 193 is provided with a cam 263, adapted to engage the guide plate corresponding with the stop 243, upon the completion of each revolution, and similarly, the shillings disk 194 is provided with a cam 263 adapted to engage the guide-plate corresponding with the stop 244, upon the completion of each revolution.

While the recording may be effected by the ordinary functions of the counting mechanism, i. e., by the direct rotation of the disks by the quadrants, as previously explained, the rods 253, although performing their reciprocal movements, are so controlled, by their guide-plates 260, that they do not come within range of the links 250. Upon either of the disks 193 or 194 completing its revolution and therefore necessitating a transfer, the cam of such disk will engage the guide plate corresponding with the next disk and so place the rod within range of the link. Upon its downward movement, such rod will engage the link (Fig. 27) and so depress the lever, that the attached stop will turn and advance its pinion one tooth, thus causing the disk, to which such pinion is attached, to register an additional figure. In this advanced position the stop will remain at the completion of the operation of the machine. At that stage at which the axis 199 is in its lower position, during the next or subsequent operation of the machine, the guide-plate is returned to its normal position, and in so returning, disengage the rod from the link and thus permit the stop to return to its normal position also, under action of the spring 248.

To restore the guide-plates 260, as above-mentioned, two arms or levers 266 (one for each of the guide plates) are provided and keyed upon a horizontal spindle 267, revolubly mounted in bearings in the framework 1. Keyed upon the said spindle also, is an arm 268 adapted, at the required stage in each operation of the machine, to be engaged (as in Fig. 28) by a cam 269 keyed upon the spindle 234, the arrangement being such that, the engagement of the said arm by the cam, will so turn the spindle 267, that the arms 266 will come into engagement with their respective guide plates and so, if necessary, carry the latter forward into their normal positions.

The remaining disks 196, 197 and 198 are simply continuation disks adapted to operate in conjunction with the disk 195 for the purpose of carrying the record of the pounds into tens, hundreds, thousands, and so forth, up to any desired limit, according to the number of such continuation disks employed. The said continuation disks are operated upon the well-known principle, consisting of a pin upon the disk 195 adapted, upon the completion of each revolution of the latter, to engage a pinion 270 and so cause the latter, which intermeshes with the pinion 205, to advance the disk an additional figure, and so on.

As already explained, the action of turning the operating handle 3 of the machine, actuates the forwarding cylinder 9, and, in addition to which, such action of the handle also operates the ink-pads 127, 138 and 140. In performing these operations, the said handle 3 completes one revolution. In order however to preclude the possibility of inaccuracies occurring in the working, due to irregularities in the speed at which the mechanism is operated, the remaining movements are actuated by automatic means. For this purpose the handle 3, during its said revolution, is adapted, in addition to its functions as above-mentioned, to wind up a spring 273 and so store up in the latter sufficient energy to actuate the machine during the stamping, recording and other subsequent operations, the speed, at which such spring operates the mechanism, being governed by means of a dash-pot. To effect this purpose, one end of the spring 273 is secured to the shaft 2, while the other end of such spring is attached to the spindle 227, upon which is keyed a pinion 274, adapted to intermesh with a spur-wheel 275, keyed upon a horizontal shaft 276, revolubly mounted in the framework 1. The said spur-wheel 275 also intermeshes with the pinion 37, for the purpose of rotating the platen-drum, as previously mentioned, while, to operate the arms 106 and 107 for the purpose of raising the platen-carrying-member as hereinbefore described, a cam 277 is keyed upon the spindle 227, such cam being adapted to engage an arm 278, upon the spindle 108, and so effect the turning of the latter. Again to effect the required rotation of the shaft 234 a pinion 271 is keyed thereon and adapted to intermesh with a pinion 272 keyed upon the shaft 227. To enable the said winding of the spring 273 to be performed as required, the spur-wheel 275 is held stationary, during the revolution of the handle 3, while to prevent the latter from turning backward under action of the said spring, a pawl 280 (Fig. 31), pivoted upon the framework 1, is adapted to engage a ratchet-wheel 281 carried upon the shaft 2. The means for so controlling the spur-wheel 275 during the winding of the spring, consist of a plate 282, arranged adjacent to the inner side face of the spur-wheel, such plate depending, by means of a hinge 283, from a link 284, which in turn is attached, by means of a second hinge 285, to the framework 1. To enable it to engage the spur-wheel, the plate 282 is provided with a projection 286, adapted to enter a slot 287 in the spur-wheel, a spring 288 being employed to maintain the plate in such position of engagement. Upon the completion of the revolution of the handle, however, the plate 282 is withdrawn so as to disengage the projection 286 from the slot 287 and so permit the spur-wheel to revolve under action of the spring 273. For this purpose, a dog, 289 is provided and attached, by means of a pivot 290, to the link 284, such dog being adapted to be engaged by a corresponding dog 291, formed upon the adjacent end of a horizontal rod 292, slidably arranged, in a transverse direction, in the framework. The said rod is provided with a spring 293, which tends to carry such rod away from the said dog 289. Connected with the other end of the rod 292, by means of a pivot 294, is one arm of a bell-crank-lever, or trigger, 295, which is fulcrumed at 296, upon the framework 1. The arrangement is such that, during the said revolution of the handle 3, a cam 297 keyed upon the shaft 2, so engages the other or free arm of the trigger 295, as to cause such rod to slide lengthwise, against the tendency of the spring 293, until the dog 291 comes into engagement with the dog 289. At the completion of the revolution of the said handle, the cam 297 releases the trigger, thereby permitting the rod 292 to return, under action of its spring 293, and, in so doing, to carry the plate 282 away from the spur-wheel 275, sufficiently to disengage the projection 286 from the slot 287, after which the dog 289 slips from engagement with the dog 291, allowing the plate 282 to bear against the spur wheel 275 so that when the revolution is completed the projection 286 again engages the slot 287. The spur-wheel 275 is thus released and permitted to turn, so as to cause the remaining movements of the machine to be performed under action of the spring 273. On the completion of this movement, the spur-wheel is again locked, by reason of the projection again entering the slot 287. As here shown, the spur-wheel is adapted to perform a quarter of a revolution at each operation and consequently it is formed with four slots, but the action would be precisely the same if such wheel were of smaller diameter, so as to make one complete revolution at each operation, in which case but one slot would be provided.

For the purpose of governing the speed at which the mechanism is operated by the spring 273, as previously mentioned, a quadrant 299 (Figs. 29 and 30), is loosely mounted upon the shaft 276, such quadrant being adapted to engage the shaft, in one direction only, by means of a dog-clutch, comprising a boss 300, keyed upon the shaft 276 and around the periphery of which boss are pivoted a plurality of dogs 301, which, as the said shaft revolves, are brought, by stationary cam-plates 302, into engagement with pins 303, upon the quadrant 299, thus causing the latter to turn with the shaft. Intermeshing with the teeth of the quadrant 299, is an intermediate pinion, 304, intermeshing also with a rack-rod, 305, slidable, in a vertical direction, in guides 306, carried upon the framework 1. Connected with the said rack-rod 305, is the piston-rod 308, of a dash-pot 309, a spring 310 being provided to maintain the rack-rod normally in the upward position.

The arrangement is such that, upon the shaft 276 commencing its turning, under action of the spring 273 the dogs 301 will come into engagement with the pins 303, and so cause the quadrant 299 to be turned by such shaft, thus, by means of the pinion 304 and rack-rod 305, depressing the plunger of the dash-pot 309 and which action continues until the completion of the operation of the machine. At the completion of the movement, however, the dogs 301 arrive at such positions that they are clear of the cams 302, and are therefore allowed to disengage the pins 303 of the quadrant. The quadrant, being thus free to turn upon the shaft, the rack-rod and plunger of the dash-pot, will, under action of the spring 310, be returned to their normal upward positions again.

Upon the completion of the operation of the machine, the matter is dropped, by the opening of the grippers 64, and passes through an opening 312 (Fig. 31) in the base of the machine, into a receptacle 313, arranged beneath to receive it. As here shown, the said receptacle is of triangular or quadrant form and is hinged or pivoted at its apex 314 so as to permit of its being closed within a cabinet 315, as shown in full lines, or opened to allow of the matter being withdrawn, the position when partially opened being indicated in dotted lines. It will be understood, however, that access might be gained to the machine through the opening 312 when the receptacle 313 is in the open condition. To prevent this a hinged flap or shutter 317 is provided and hinged upon the underside of the base, such flap being so arranged, that, while the receptacle is closed, such flap will hang downward, as indicated in full lines, for the purpose of allowing the matter to pass through the said opening 312, but the action of opening such receptacle will cause the flap to turn upward, into the dotted line position, and so cover the opening. As an additional precaution, the receptacle is so arranged that the operating handle 3 is locked from turning while such receptacle is open and means are also provided for preventing the receptacle from being opened after the operation of the machine has commenced. For this purpose, a lever 318 is fulcrumed, by one end, to the cabinet 315, and extends therefrom in a forwardly direction. Upon the forward end of the said lever, is provided a pin or roller 319 adapted, when the receptacle is in the closed condition, to enter a notch or recess 321, formed in one of the sides of such receptacle, the said notch being so formed as to serve as a cam for the purpose of lifting the lever during the opening of the receptacle. Connected with the said lever 318, by means of a link 322, is a vertical rod 323, slidably mounted, by means of pins 324, carried upon the framework 1 and received within vertical slots 325 in the rod, a spring 326 being provided to draw such rod in a downward direction. Upon the shaft 2 is keyed a disk 327, in the periphery of which is provided a notch 328, into which the upper end of the rod 323 is adapted to enter, when the handle 3 is in the normal position before the operation of the machine has been commenced. The arrangement is such that, while the receptacle is closed, the rod 323 will be maintained downward, clear of the notch 328, but upon such receptacle being opened, the lever 318 will be raised, by reason of the engagement of the roller 319 with the notch 321 and the adjacent portion of the edge or periphery of the end of the receptacle, the result being that the rod 323 will be raised thereby so that the upper end of the latter will enter the notch 328 and so lock the handle from turning until the receptacle is again closed. It will be understood also, that, once the turning of the handle is commenced, the notch 328 will be carried out of register with the end of the rod 323 and consequently, as the lever 318 will be unable to rise under such condition, the receptacle will be thereby locked from opening until the revolution of the handle 3 has been completed. As, however, previously explained, the handle 3 completes its revolution before the remaining movements are commenced, under action of the spring 273, the notch 328 will again register with the end of the rod and would therefore permit the receptacle to be opened before such remaining operations of the machine take place. To prevent this, a plate 330 is loosely mounted upon the shaft 2 and is adapted to be turned by friction with the disk 327, such plate being provided also in its periphery with a notch 331, adapted also to receive the end of the rod 323. Upon the shaft 276, is keyed a disk 332, in the periphery of which is formed a notch 333, adapted to receive a projection 334 upon the rod 323 when the latter is in the aforesaid upward position. Pivoted, by means of a pin 336, upon the framework 1, is a lever 337, one end of which is engaged by a pin 338, carried upon the disk 332, while the other end of such lever is adapted to engage and control the said plate 330.

The arrangement is such that before the turning of the handle 3 is commenced, the notch 331 of the plate, will be in alinement with the notch 328, of the disk 327, both of which notches will be in register with the top of the rod 323, while the notch 333, of the disk 332, will also be in register with the projection 334 of the rod, all as shown in Fig. 31. In this position therefore, the receptacle will be free to open. Upon the turning of the handle 3 being commenced, however, the plate 330, will, by reason of its friction with the disk 327, begin to turn with the latter until such plate comes in contact with, and is therefore arrested by, the lever 337, which latter is restrained by the pin 338, as shown in Fig. 32. The notch 331 is therefore out of register with the end of the rod 323, and in which condition the plate 330 remains until the shaft 276 commences its rotation. It will therefore be impossible, at this stage, to open the receptacle, owing to the fact that the rod would be prevented from rising by the periphery of the plate 330. Upon the commencement of the rotation of the shaft 276, the disk 332 will begin to turn also, and so carry its notch 333 out of register with the projection 334 as in Fig. 33, and thus again the receptacle will be locked, as upon the rod attempting to rise, the projection 334 will come in contact with the periphery of the disk 332, and which condition will obtain until the machine has completed its operation and so brought the disk 332 to the position at which its notch 333 will again register with the projection 334. The disk 332, in so commencing its rotation, causes its pin 338 to turn the lever 337 and so restore the plate 330 to the position at which the notch 331 will register with the end of the rod.

Owing to the fact that the shaft 276, as here shown, makes but a quarter of a revolution during each operation of the machine, for the reason previously explained, the disk 332 is provided with four notches 333 and four pins 338.

For the purpose of operating the flap 317 (Fig. 31), such flap is carried upon a spindle 340, revolubly arranged in bearings upon the base of the machine. The said spindle 340, which therefore constitutes the hinge of the flap, has keyed upon it a pinion 341 with which is adapted to intermesh a rack-rod 342, attached to the said lever 318. The arrangement is such that the raising of the lever, occasioned by opening the receptacle, will, through the interaction of the rack and pinion, turn the spindle 340 and so bring the flap into its upward position. The handle 3, after making its said revolution, is locked so as to prevent it from being again turned until the remaining movements of the machine have been completed under action of the spring 273. For this purpose, keyed upon the shaft 2, is a cam 344 (Figs. 34 and 35), having upon its periphery a shoulder 345, adapted, upon the completion of the revolution of the handle 3, to be engaged by a dog or pawl 346, thus preventing further turning of the said shaft 2. The said pawl 346 is keyed upon a spindle 347, revoluble in the framework 1, and upon which spindle is keyed also an arm or lever 348, which is provided with a spring 349, which tends to keep the pawl 346 in engagement with the periphery of the cam 344. To cause the said pawl to disengage the cam upon the completion of the operation of the machine, a rod 350 is provided and slidably mounted, by means of pins 351 carried upon the framework 1 and received within slots 352 and 353 in such rod. The construction is such, that, as the aforesaid rack-rod 305 descends, as explained, during the operation of the machine, a pin or projection 354, upon such rack-rod, will engage a projection 355, upon the lower end of the rod 350, and carry the latter aside (as indicated in Fig. 35) sufficiently to permit of the said pin 354 passing under the projection 355, the slot 353 being so formed as to allow the rod 350 the required amount of lateral movement. Upon the return movement of the rack-rod to its normal upward position at the completion of the operation of the machine therefore the pin 354, by reason of its engagement with the underside of the projection 355, will carry the rod 350 upward, thereby causing the upper end of such rod to engage and raise the arm 348, thus disengaging the pawl 346 from the shoulder 345 of the cam. To maintain the pawl 346 in this disengaged position, a detent-block 356, is pivoted, at 357, upon the side face of the came 344, such block being provided with a spring 358, which tends to turn the block, upon its said pivot 357, so as to project radially from the center of the cam, and, in which position, the outer end of such block engages a pin 360 upon the side of the pawl 346 and so maintains the latter in the outward or disengaged position. Upon the handle 3 being rotated, the shoulder 345 will be carried past the pawl 346, after which the block 356 will be carried past the pin 360 and so allow the pawl to come in contact with the periphery of the cam 344, in readiness to again engage the shoulder 345, on the completion of the revolution.

To prevent the handle 3 from being turned so as to operate the machine when any of the levers 160, 164 and 168 are in an intermediate position; that is to say with their pointers 178 indicating a position between two adjacent figures upon their respective graduations 177, each of such levers is provided with what will be termed a "check-quadrant" 362 (Figs. 29 and 36). Each of the said check-quadrants is formed, in its periphery, with a series of teeth 363, while, adapted to enter between the teeth of such quadrants respectively, are three pickers 364 (one for each quadrant), which pickers are all keyed upon a common horizontal spindle 365, revolubly mounted in the framework 1. Keyed also upon the said spindle 365, is an arm 366 provided with a projection 367, which, when the handle 3 is in the normal position, before its revolution has commenced, will register with a notch 368, formed in the periphery of a disk 370, keyed upon the shaft 2. The arrangement is such that, while the levers 160, 164 and 168 are truly placed, so that their pointers 178 register exactly with any figures upon their respective graduations 177, the check-quadrants of such levers will thereby be brought into such positions that their respective pickers will enter between the teeth of such quadrants, as shown in Fig. 36. Should any, or all, of the said levers be placed in an intermediate position so as to register between two adjacent figures of the graduations, however, the check-quadrant of such lever will be in such position that its picker, instead of entering between the teeth, will ride upon the top of one of such teeth, thus causing spindle 365 to turn slightly and so bring the arm 366 into such position that its projection 367 will enter the notch 368 and so lock the handle 3 from turning.

Upon the levers being adjusted so as to register truly with the desired figures upon the graduations, as above explained, and the rotation of the handle 3 commenced, the notch 368 will be carried past the projection 367. At this stage therefore the periphery of the disk 370 will be presented to the projection 367 and consequently the arm 366 will be unable to make the movement required to permit of the pickers leaving their positions of engagement between the teeth 263, the result being, that it will be impossible to alter the setting of the levers until the notch 368 is again brought into register with the projection 367, upon the completion of the revolution of the handle 3. In order to continue this locking action of the levers until the remaining movements of the machine have been performed by the spring 273, a lever 372 is pivoted at 373 upon the framework. During the said revolution of the handle 3, the roller 5 of the rod 7, comes into engagement with the lever 372, and causes the latter to turn upon its pivot, into such a position that its upper end will engage the lower edge of a plate 375, keyed upon the spindle 365, thus preventing the latter from turning. By this means therefore the pickers will be maintained in their positions of engagement with the check-quadrants and so will prevent the levers from being again moved until the notch 368 comes into register with the projection on the completion of the revolution of the handle 3.

To return the lever 372 to its original position and thus release the spindle 365, at the completion of the operation of the machine, a cam 376 is keyed upon the spindle 234, such cam being adapted, at the required stage in the operation, to engage an arm 377, keyed upon a horizontal axis 378, revoluble in the frame work 1. The said axis 378 may conveniently consist of a sleeve, loosely mounted upon the spindle 347, as here shown, and upon which sleeve also is carried a pin or projection 380, adapted to engage and restore the lever 372 when such sleeve is turned by the engagement of its arm 377 with the cam 376.

To prevent the operating handle from being turned when all the levers 160, 164 and 168 are in the neutral or zero positions, three pickers 382 are provided and adapted to enter respectively notches 383 provided one in each of the check-quadrants 362, when the respective levers are in their neutral positions. The said pickers 382 are all keyed upon a common spindle, 384, and upon which is keyed also an arm 385, having a projection 386 adapted, when the handle 3 is in its normal position, before its revolution is commenced, to enter a notch 387 formed in the periphery of the aforesaid disk 370. The arrangement is such that while all the levers are in their neutral positions, all the pickers 382 will lie within their respective notches 383 and so permit the projection 386 to enter the notch 387 and thus prevent the handle 3 from being turned. Upon any one or more of the levers being moved to select a denomination, the check-quadrant connected with such lever will carry its notch 383 past the corresponding picker, which latter will in consequence be caused to ride upon the periphery of such quadrant, and in so doing will turn the arm 385 and disengage the projection 386 from the notch 387.

To prevent the mechanism from being tampered with, the machine is provided with a case or cover 390 (Fig. 1) in which is provided an opening 391 to receive the plate 176, and also a suitable slot through which the matter is inserted, a ledge 392 being provided beneath the slot to facilitate the passage of the matter therethrough to the forwarding cylinder.

To enable the machine to be conveniently locked from action from the exterior of the case, a vertical rod 393 is slidably arranged upon the framework 1, in rear of and adjacent to the arm 366 which latter is provided with a recess or notch 394 adapted when such arm is in the disengaged position, to receive a projection 395 carried upon the rod 393. The said rod is provided with a spring 396 which tends to normally maintain such rod upward and in which position its projection 395 coincides with the notch 394. Upon the said rod being depressed however, the projection 395 will be carried past the notch 394 and in so doing will carry the arm 366 forward thus causing the projection 367 to enter the notch 368, as shown in Fig. 31. To enable this locking to be effected when the case 390 is in place, the latter is provided with a plunger 397 adapted when depressed, to engage the upper end of the rod 393 and so depress the latter also. To retain the rod 393 in the lower position, such rod is formed with a notch 398 adapted to receive the end of a horizontal rod 399 slidably mounted upon the framework 1 and provided with a spring 400 which tends to carry such rod into engagement with the notch 398. To unlock the machine therefore, it is necessary to withdraw the rod 399 from the notch, whereupon the rod 393 will rise under action of its spring 396 and so return the projection 395 to its position of co-incidence with the notch 394. This withdrawal of the rod 399 may be effected by hand when the cover 390 has been removed, or, if so desired, a suitable key adapted to be inserted through an opening in the case may be employed for this purpose.

I claim:

1. In a machine of the class described, in combination with impressing mechanism, a cylinder rotatable upon a horizontal axis for the purpose of forwarding the matter, a series of fixed grippers disposed in line longitudinally upon said cylinder, a corresponding series of mechanical grippers mounted upon such cylinder and adapted to co-act with said fixed grippers in engaging the matter to be franked, means for causing said grippers to engage and disengage the matter when required, an operating handle adapted to make a complete revolution, a rod slidably mounted upon the framework of the machine and adapted under action of the said revolution of the handle to make a reciprocal movement, rack-teeth formed upon said rod, and a pinion upon aforesaid cylinder adapted to intermesh with said rack-teeth for the purpose of causing such cylinder to turn through a portion of a revolution to forward the matter and return to its original position.

2. In a machine of the class described, the combination of impressing mechanism, a cylinder adapted to receive and forward the matter to the impressing mechanism, a guard mounted upon said cylinder parallel to the axis and at a slight distance from the periphery thereof, fixed grippers mounted upon said guard, mechanical grippers carried by the cylinder and adapted to coact with said fixed grippers, a series of stops adapted to support the matter, and means for moving said stops out of engagement with the matter when the cylinder is revolved and the grippers engage the matter.

3. In a machine of the class described, in combination, a frame, dies mounted thereon adapted to impress the value of the frank upon the matter, a platen revolubly carried by said frame, means for causing an interrupted revolution of the platen about its axis, and means for imparting bodily movement to said platen radially of its axis of rotation during the said interruption whereby the matter carried thereby is brought against the said franking dies.

4. In a machine of the class described, in combination, means for receiving and forwarding individual pieces of matter, a set of denomination dies adapted to impress the value of the frank, a plurality of supplementary dies adapted to impress the matter also to complete such frank, means for receiving said individual pieces of matter from the said forwarding means and means for causing such pieces to come in contact with and be impressed by each of said dies successively.

5. In a machine of the class described, the combination with means for receiving and forwarding the matter, a set of denomination dies adapted to impress the value of the frank upon the matter and one or a plurality of supplementary dies adapted to impress the matter also for the purpose of completing the frank, of means for receiving such matter from the said forwarding device and for carrying such matter into contact with so as to be impressed by the said dies, comprising a drum-member adapted to perform a complete revolution upon a horizontal axis, a carrying-member loosely mounted upon said axis and adapted both to rotary movement with the said drum-member and also to a reciprocal movement diametrically in relation to the said axis, a platen upon said carrying-member, a stationary sun-wheel, a pair of planet-wheels revoluble upon axes mounted upon one end of said drum-member and intermeshing with said sun-wheel, a pair of cams carried one upon each of the said planet wheels and adapted to so engage the said carrying-member during the revolution of the said drum-member as to cause such carrying-member to commence to revolve with the drum-member, and at the required point to temporarily arrest such rotary movement of the carrying-member and to subsequently cause such carrying-member to resume and complete its revolution with the said drum-member, and means for causing such carrying-member during its said pause in its rotation to perform its said reciprocal movement diametrically of the said axis.

6. In a machine of the class described a platen-carrying-member comprising a pair of end members formed with slots through which the axis passes and two longitudinal members connecting such end members one of such longitudinal members upon which the platen is mounted being resiliently arranged in relation to the other portions of such platen-carrying-member.

7. In a machine of the class described, a frame, dies mounted thereon, a platen-carrying-member revolubly mounted on said frame, means for imparting interrupted rotation to said carrying-member, a platen formed upon said carrying member, means for imparting bodily movement to said carrying member radially of its axis of rotation during the interruption, to cause the platen to move against the dies, a series of grippers mounted upon said carrying-member, means for causing the grippers to engage the matter before a revolution of said carrying member is commenced, and means for causing the grippers to release the matter upon completion of the operation.

8. In a machine of the class described, the combination with a set of denomination dies, a platen adapted to bring the matter into contact with such dies, and a drum-member carrying said platen and adapted to make a complete revolution upon a horizontal axis for the purpose of so actuating the said platen, of means for inking such dies, comprising an ink-roller revolubly carried upon said drum-member and adapted to come in contact with the said dies previous to their impression upon the matter.

9. In a machine of the class described, in combination, with a set of denomination dies and a revoluble platen, means for inking said dies comprising an inking roller, carried by said platen and in advance thereof, an ink pad having its surface a segment of a cylinder revolubly supported upon the frame of the machine, and means operated by the machine for revolving said ink pad, said ink pad being so located that the inking roller contacts therewith before reaching the dies.

10. In a machine of the class described, the combination with a platen adapted to carry the matter and to make a complete revolution and a drum-member carrying said platen and by means of which such platen is so actuated, of one or more supplementary dies of segmental form and carried upon horizontal axes in the framework of the machine at such point that the peripheries of such dies will come in contact with the matter during the said revolution of the platen, a quadrant carried upon the said drum-member, and pinions mounted one upon each of the said dies, and each adapted to intermesh with said quadrant for the purpose of bringing said dies into the operative position so as to impress the matter.

11. In a machine of the class described, in combination, a revoluble platen adapted to receive the matter, a set of denomination dies, comprising a plurality of disks each having upon its periphery a series of stamps representing figures, concentric axes upon which said disks are mounted, means for separately turning said disks, and means for reciprocating the platen radially of its axis of rotation to effect contact of the matter with the dies.

12. In a machine of the class described, a casing, a revoluble platen adapted to receive the matter, a set of disks having denomination dies thereon, concentric axes upon which said disks are mounted, a set of hand levers extending through slots in the casing, and gearing by which said hand levers operate said disks, the casing having graduations alongside the slots to indicate the figures of the disks which are in operative positions, and means for reciprocating the platen radially of its axis of rotation to effect contact of the matter with the dies.

13. In a machine of the class described including means for forwarding the matter, means for impressing such matter, means for inking the dies, and means for recording the value of the frank supplied, an operating handle adapted to be turned by hand through one revolution, a slidably arranged rod adapted in response to said revolution to perform a reciprocal movement for the purpose of operating the said forwarding means and inking mechanism, and a spring adapted to be wound by the said operation of the handle for the purpose of causing such spring to actuate the said impressing and recording means.

14. A machine for the purpose indicated comprising a cylinder adapted to receive the matter and to forward such matter to the interior of the machine, a platen adapted to receive such matter from the cylinder, means whereby said platen will be caused to make a complete revolution around a horizontal axis, means whereby the said platen at the desired point in its said revolution will be caused to temporarily desist from its rotary movement and to make a reciprocal movement diametrically in relation to its said axis, a set of adjustable dies adapted to come in contact with the matter and impress the value of the frank thereon when the platen is performing its said reciprocal movement, one or a plurality of supplementary dies each adapted during the said revolution of the platen to come in contact with and impress the matter for the purpose of completing the frank, means for inking the dies, and means whereby the said denomination dies may be adjusted for the purpose of causing them to impress the desired value of the frank upon the matter.

In witness whereof I have hereunto set my hand in the presence of two witnesses.

ERNEST MOSS.

Witnesses:
CYRIL CARLYON COATES,
SIDNEY JAMES TRILCAVES.